Figure 1:
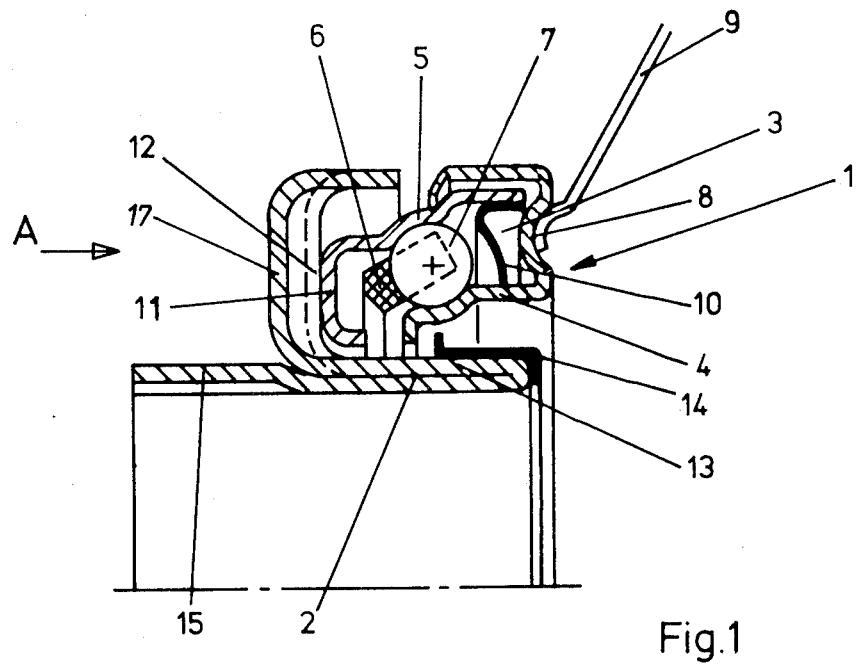

United States Patent [19]

Ernst et al.

[11] 3,963,106
[45] June 15, 1976

[54] CLUTCH DISENGAGER WITH SLIDING SLEEVE

[75] Inventors: Horst Manfred Ernst, Eltingshausen; Manfred Brandenstein, Aschfeld; Armin Olschewski, Schweinfurt, all of Germany

[73] Assignee: SKF Industrial Trading and Development Company, B.V., Plettenburgerweg, Jutphaas, Netherlands

[22] Filed: Dec. 6, 1974

[21] Appl. No.: 530,310

[30] Foreign Application Priority Data
Dec. 21, 1973 Germany................... 7345381[U]

[52] U.S. Cl.................... 192/98; 192/110 B
[51] Int. Cl.².......................... F16D 19/00
[58] Field of Search................ 192/98, 110 B

[56] References Cited
UNITED STATES PATENTS

| | | | |
|---|---|---|---|
| 3,631,954 | 1/1972 | Coaley | 192/98 |
| 3,741,361 | 6/1973 | Brandenstein | 192/110 B |
| 3,788,437 | 1/1974 | Camp | 192/98 |
| 3,877,557 | 4/1975 | Maucher | 192/98 |
| 3,877,558 | 4/1975 | Endo | 192/110 B |

*Primary Examiner*—Samuel Scott
*Assistant Examiner*—Randall Heald
*Attorney, Agent, or Firm*—Daniel M. Rosen

[57] ABSTRACT

A clutch disengager including a sliding sleeve having a radially extending flange formed by a wall doubling over the end of the sleeve to form a cuff, ending in the flange, and an antifriction bearing adapted for movement on the sleeve and including a nonrotating inner race having an inwardly extending flange resting against the sleeve flange, to form a self-supporting unit.

8 Claims, 2 Drawing Figures

CLUTCH DISENGAGER WITH SLIDING SLEEVE

THE INVENTION

The present invention relates to clutch mechanisms, and particularly to a clutch disengager having a sliding sleeve and an antifriction bearing arranged for radial movement therein, and whose nonrotating bearing ring rests against a radial flange of the sliding sleeve.

A device wherein the antifriction bearing is arranged for radial movement on the sliding sleeve for its self-centering is disclosed in the published German Unexamined Application for Pat. No. OS 2,131,285. As disclosed therein, the sliding sleeve is made by noncutting methods from sheet metal and consists of several parts which must be connected to each other after assembly.

The object of the present invention is to provide a clutch disengager which may be constructed of relatively few components.

The foregoing object is achieved in accordance with the present invention by providing, in a clutch disengager of the aforementioned type, a sliding sleeve as a single shaped part produced by noncutting methods from sheet metal, wherein this part is cuffed over in the region of the bore and is thus double walled over a part of its length. The radial outer wall part passes into a radially directed flange used as a rest for the nonrotating bearing ring.

Such a device can be economically manufactured as a self-supporting unit ready for installation with only a few shaped sheet metal parts. By the development of the sliding sleeve in a single piece, a high strength is realized which is not present in prior art clutch disengagers.

As a further development of the invention, the flange of the sliding sleeve is partially hardened, at two points of the circumference of the flange for the action thereon of a disengagement fork. This has the advantage that the part of the sliding sleeve having high internal stresses as a result of the deformation does not need to be hardened, thereby avoiding inaccuracies which may be caused by a hardening distortion of the sliding sleeve. In this connection, there is a favorable effect on the hardening process and on reduction in wear if the flange is provided at the hardened points with an axially outward protruding surface of attack for the disengagement fork.

In accordance with another feature of the invention, the axially directed free end on the bore side of the displacement sleeve has two diametrically opposed two-edged embossings to receive the disengagement fork. In this way the disengagement fork can be connected with the sliding sleeve in a manner which is secured against twisting.

Figure 2:
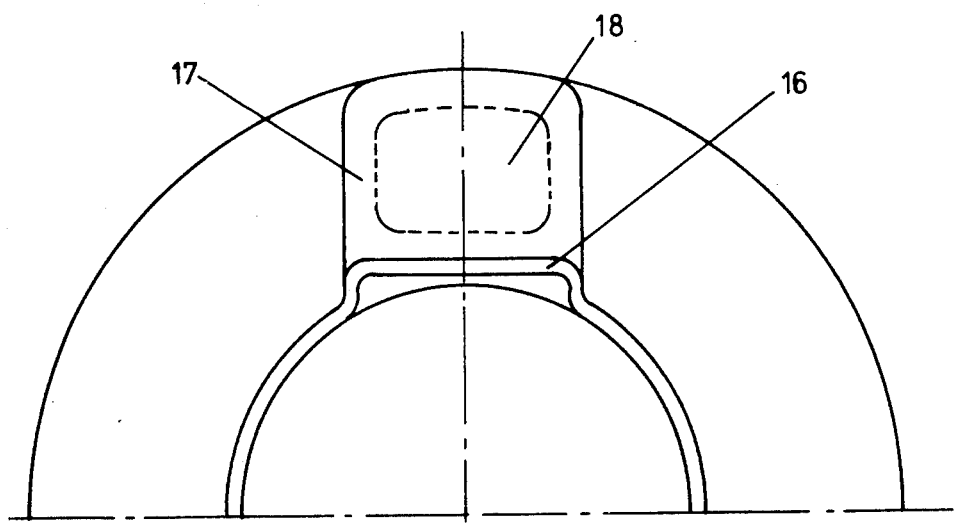

Further features and advantages of the invention will become evident from the following more detailed description of an illustrative embodiment, taken in conjunction with the appended drawings, wherein:

FIG. 1 is an axial section through a clutch disengager in accordance with the invention, and FIG. 2 is a view in the direction A of FIG. 1.

Referring to FIG. 1, the clutch disengager 1 is provided with a sliding sleeve 2 made of sheet metal and an antifriction bearing 3. The antifriction bearing 3 has an inner race 4 of sheet metal, a similar outer race 5, and balls 7 guided in a cage 6. One face surface 8 of the U-shaped inner race 4 is developed concave in the form of a circular ring and comes into contact with clutch levers 9 of a clutch (not shown). For sealing the antifriction bearing 3, a sealing disc 10 is provided and fastened on the outer race 5 which, as shown, partially protrudes into the inner race 4.

The antifriction bearing 3 is arranged for radial movement on the sliding sleeve 2, the nonrotating outer race 5 resting via its radially inwardly directed flange 11 on a flange 12 of the sliding sleeve 2. The sliding sleve 2 is a single shaped part made by noncutting methods from sheet metal, which is cuffed in the region of the bore and is double walled over a part of its length. The radially outer wall part 13 thereby passes into the radially directed flange 12. An angle ring 14 is fastened on the wall part 13, and both seals off the antifriction bearing 3 from outside contact, and also serves for axially securing the bearing 3 on the sliding sleeve 2. In this manner, the entire clutch disengager 1 is a self-supporting unit.

As described above, the outer race 5 of the antifriction bearing 3 is arranged with both radially inward and radially outward play along the sliding sleeve 2. In this way, the antifriction bearing 3 can move in a radial direction when the clutch levers 9 effects centering via the face surface 8.

On the bore side, the axially directed free end 15 of the sliding sleeve 2 is provided with two diametrically opposed two-edged embossings 16 (FIG. 2) which serve to receive a disengagement fork (not shown), positioned to be secure against turning on the sliding sleeve 2.

The flange 12 of the sliding sleeve 2 is provided with an axially outwardly protruding engagement surface 17 for the engagement of the disengagement fork (not shown) on each of two places of its circumference. In this connection it is advantageous if these engagement surfaces 17 are partially hardened (indicated in FIG. 2 in dashed line and designated as 18). By this measure it becomes superfluous to harden the entire sliding sleeve 2, so that a hardness distortion is avoided at the places which exhibit high internal stresses as a result of a noncutting shaping. The sliding sleeve 2 has the highest internal stresses in the region of the cuffed, double walled portion of the bore. The right angle between the radial flange 12 of the sliding sleeve 2 and the axially directed free end 15 which has been obtained by the noncutting shaping is not impaired upon the hardening of the engagement surfaces 17.

What is claimed is:

1. A clutch disengager comprising a sliding sleeve having a radially extending flange, and an antifriction bearing arranged for radial movement thereon, said bearing including a rotating race and a nonrotating race, said nonrotating bearing race adapted to rest against said radial flange of said sliding sleeve, said sliding sleeve including a bore hole, said sliding sleeve being a single part formed by noncutting methods from sheet metal and having a cuff in the region of said bore hole, said cuff resulting in a radial outer wall part forming, on said sleeve, a continuous double wall over a part of said sleeve length, said radial outer wall part of said cuff passing into said radially extending flange for support of said nonrotating bearing race.

2. The clutch disengager according to claim 1, wherein said flange is provided, at two points of its circumference, with an axially outwardly protruding engagement surface.

3. A clutch disengager according to claim 1, wherein said flange is partially hardened at two points of its circumference, for supporting external engagement.

4. A clutch disengager according to claim 1, wherein the bore side, axially directed free end of said sliding sleeve has two diametrically opposite, two-edged embossings for receiving external engaging means.

5. A clutch disengager as set forth in claim 2, wherein said flange is hardened at said two points of its circumference.

6. A self-supporting cluch disengager comprising a tubular sleeve having a double walled end portion at one end thereof, the outer wall of said double wall extending from the inner wall at the end of said sleeve and cuffed thereon to continuously form said double wall, said outer wall further extending away from said sleeve to form an outwardly extending radial flange, and an antifriction bearing mounted about said double walled end portion, said bearing including a rotating race and a nonrotating race, said nonrotating race including a radially inwardly directed flange, said bearing arranged for movement on said sleeve with the said nonrotating race radially inwardly directed flange resting on said outwardly extending radial flange of said sleeve.

7. The clutch disengager of claim 6, wherein said nonrotating race includes a portion protruding into said rotating race, and a sealing means provided between said portion protruding into said rotating race, and said rotating race for sealing a plurality of roller elements encaged therebetween.

8. A self-supporting clutch disengager comprising a tubular sleeve having a double walled end portion at one end thereof, the outer wall of said double wall extending from the inner wall at the end of said sleeve and cuffed thereon to continuously form said double wall, said outer wall further extending away from said sleeve to form an outwardly extending radial flange, and an antifriction bearing mounted about said double walled end portion, said bearing including a rotating race and a nonrotating rate, said nonrotating race including a radially inwardly directed flange, said bearing arranged for movement on said sleeve with the said nonrotating race radially inwardly directed flange resting on said outwardly extending radial flange of said sleeve, wherein said nonrotating race includes a portion protruding into said rotating race, and a sealing means provided between said portion protruding into said rotating race, and said rotating race for sealing a plurality of roller elements encaged therebetween.

* * * * *